Jan. 5, 1954 R. CAHEN 2,665,335

STEREOSCOPIC TELEVISION METHOD AND APPARATUS

Filed July 25, 1949 5 Sheets-Sheet 1

INVENTOR
ROGER CAHEN
BY
Bailey, Stephens & Huettig
ATTORNEYS

Jan. 5, 1954 R. CAHEN 2,665,335

STEREOSCOPIC TELEVISION METHOD AND APPARATUS

Filed July 25, 1949 5 Sheets-Sheet 2

INVENTOR
ROGER CAHEN
BY
Bailey, Stephens & Huettig
ATTORNEYS

INVENTOR
ROGER CAHEN
BY
Bailey, Stephens & Huettig
ATTORNEYS

INVENTOR
ROGER CAHEN
BY
Bailey, Stephens & Huettig
ATTORNEYS

Jan. 5, 1954 R. CAHEN 2,665,335

STEREOSCOPIC TELEVISION METHOD AND APPARATUS

Filed July 25, 1949 5 Sheets-Sheet 5

INVENTOR
ROGER CAHEN
BY
Bailey, Stephens & Huettig
ATTORNEYS

Patented Jan. 5, 1954

2,665,335

UNITED STATES PATENT OFFICE 2,665,335

STEREOSCOPIC TELEVISION METHOD AND APPARATUS

Roger Cahen, Paris, France, assignor to La Radio Industrie, Paris, France, a society of France Application July 25, 1949, Serial No. 106,724

Claims priority, application France August 3, 1948

5 Claims. (Cl. 178—6.5)

The present invention relates to methods and apparatus for giving the feeling of relief in the reproduction of pictures, and more especially of television pictures, for instance obtained through telecinematographic systems, it being understood that features of my invention are applicable to moving picture systems without television.

The chief object of my invention is to provide methods and apparatus of this kind which permit simpler and more accurate arrangements than up to now, and do not impose on the eye a painful accommodation stress.

It consists, chiefly, while making use of pairs of stereoscopic images, every pair of which is juxtaposed and scanned as a single image, with a synchronizing pulse transmitted at the end of each line, in applying, at the receiver, said pulses to a device which controls the formation on the receiver screen of a composite image constituted by the successive superimposition, line by line, of the two stereoscopic images of every pair, in polarizing the light of the image thus obtained at the receiver by means of a device which alternately directs the polarization plane from a given position to a position perpendicular thereto, the rate of these changes of polarization plane being equal to the rate of succession of the lines on the receiver screen, and in viewing the images thus polarized through polarizing glasses arranged in such manner that each eye perceives only one of the set of alternate lines of said images.

Preferred embodiments of the present invention will be hereinafter described with reference to the accompanying drawings, given merely by way of example and in which:

Figs. 1 and 2 are diagrammatic explanatory views;

Fig. 3 diagrammatically shows a television transmitter made according to the invention to transmit stereoscopic pairs of pictures;

Fig. 4 illustrates on a larger scale the scanning of the screen of this camera tube;

Fig. 5 diagrammatically shows a relief television receiver made according to an embodiment of my invention;

Fig. 5*a* is a block diagram of this receiver;

Figures 8, 9:
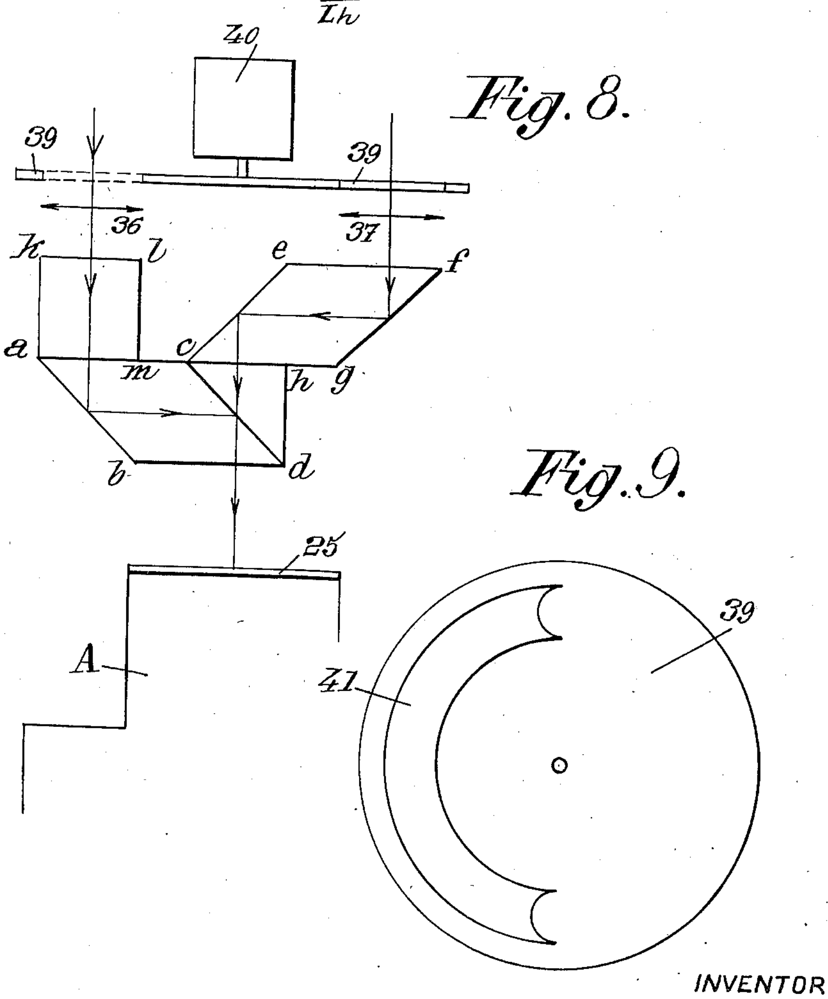
Figures 10, 11, 12:
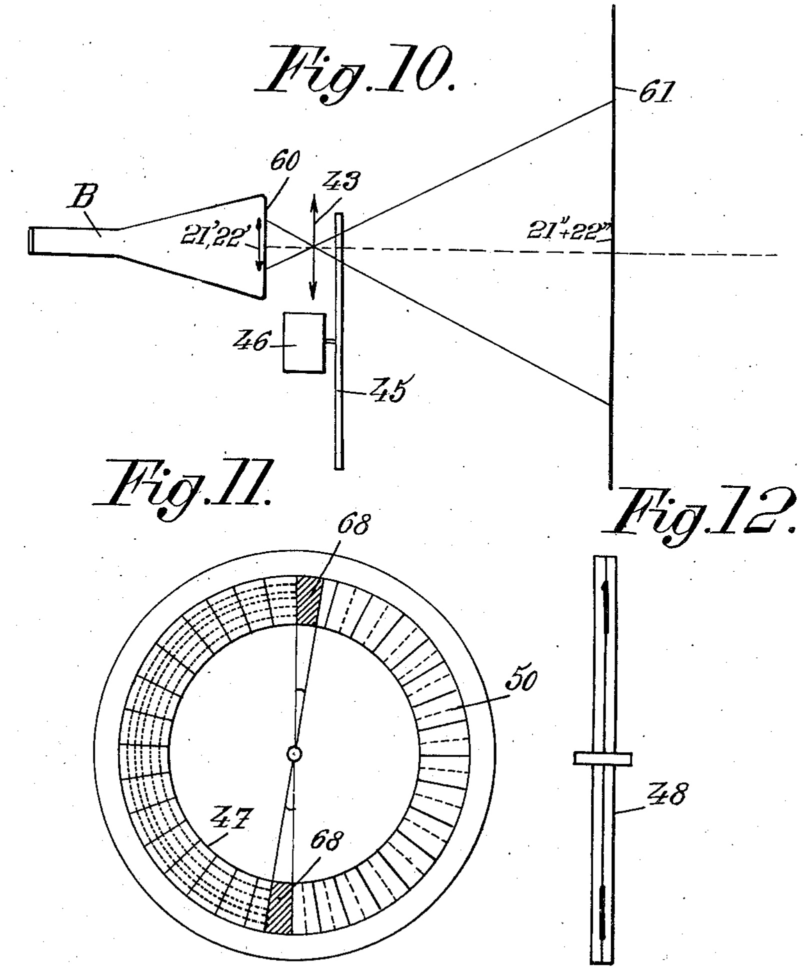
Figure 14:
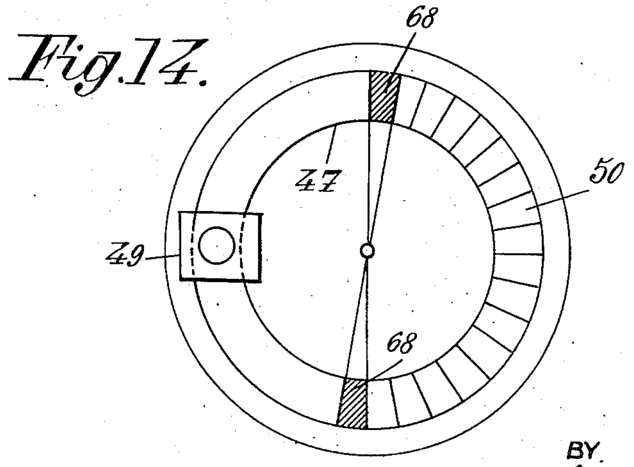
Figure 13:
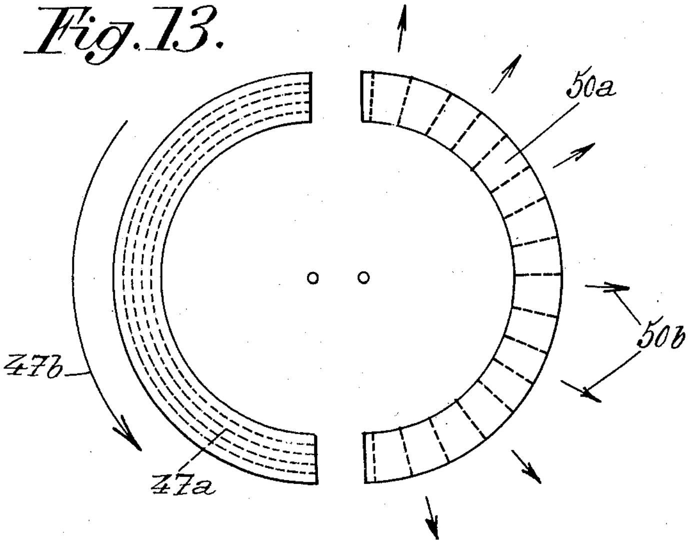
Figure 15:
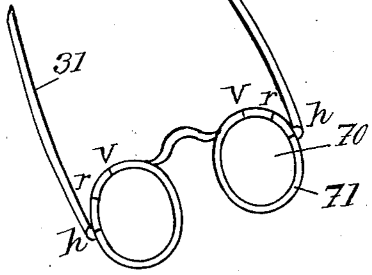
Figure 16:
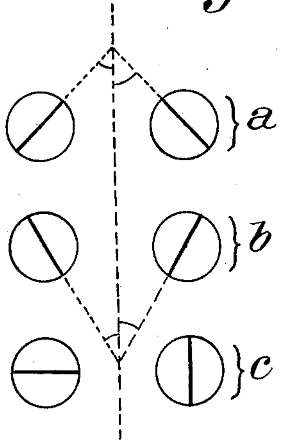

Fig. 8 diagrammatically shows a device for scanning a camera tube according to another embodiment of my invention;

Fig. 9 shows a shutter disc to be included in the device of Fig. 8;

Fig. 10 diagrammatically shows a receiver arrangement according to my invention for the modulated signal supplied by a system of the kind of that of Fig. 8;

Figs. 11 and 12 diagrammatically show, respectively in elevation and in section, a polarizer disc to be included in the receiver of Fig. 10 according to my invention;

Figs. 13 and 14 diagrammatically show in elevation a polarizing device to be included in this receiver, according to two other embodiments of my invention;

Fig. 15 shows in diagrammatic perspective view a system of spectacles according to my invention for giving the sensation of relief, in particular in combination with the above mentioned television installations;

Fig. 16 is a diagram illustrating a relative arrangement of these spectacles.

First it will be reminded that it has been known for a long time to differentiate stereoscopic pairs of pictures through optical polarizing. This method was indicated as early as 1890 by Wiener and carried out in 1891 by Anderton and in 1900 by Weinberg.

Figures 1, 2, 3, 4:
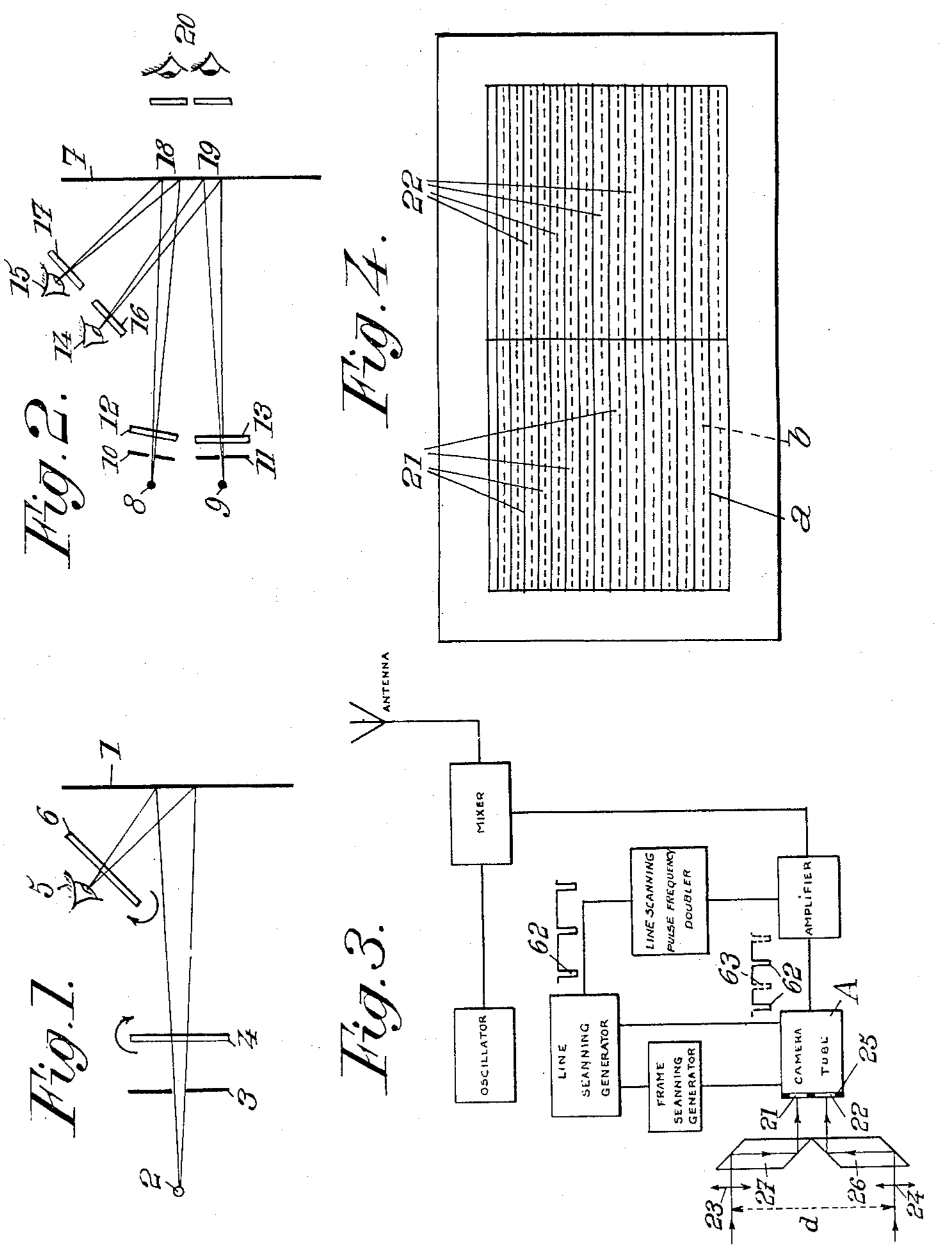

When, as shown by Fig. 1, the image of a light source 2 is projected through a diaphragm 3 on a suitable reflecting or diffusing screen 1 and a polarizing filter 4, for instance consisting chiefly of hereapathite, is interposed at any point of the path of travel of the light rays, the eye 5 sees this image normally without being able to detect that it is made of polarized light rays. If, now, there is placed across the path of travel of the reflected or diffused rays which form the image on the retina, another polarizing filter having the same plane of polarization as the first one, the image is still visible. But if the plane of polarization of either of the filters is rotated about its axis, the image is gradually attenuated and then disappears. If one of the planes of polarization is rotated through 360° with respect to the other, the image appears and disappears twice. The appearances and disappearances correspond to rotations of 90° of the filters with respect to each other, every time their planes of polarization are parallel or perpendicular to each other. These angular values of the relative position of the filters are constant, unless another cause intervenes to vary the plane of polarization determined by one filter; in this case, the variation of the plane of polarization makes it necessary to vary the position of the other filter by the corresponding algebraical value, in order to ensure the above mentioned appearances and disappearances.

Supposing now (Fig. 2) that the images of two light sources 8 and 9 through diaphragms 10 and 11 are projected on a screen 7, with the interposition of polarizing filters 12 and 13 the planes of polarization of which are disposed at right angles to each other, the eye, when bare, will perceive with an equal intensity both of the projected images.

But if the observer places in front of each of his eyes 14 and 15 polarizing filters 16 and 17 (in the form of spectacles for instance), the planes of polarization of which are respectively perpendicular to the planes of polarization of filters 12 and 13, the left eye 15 will see the left image 18 and not the right image 19; on the other hand, the right eye 14 will see the right image 19 and not the left image 18.

The same results are obtained if, instead of a reflecting screen 7, a translucent screen is observed from the other side, the eyes being located at 20; however an apparent inversion of the images occurs, which can be compensated for by crossing the optical axes of projection.

It follows that if the two luminous pictures of a stereoscopic pair are projected on a screen in these conditions, a sensation of relief is obtained if the images are suitably different and if the eyes perform synthesis thereof. The angular difference between the two images may be given any desired value in accordance with the desired intensity of relief to be obtained.

According to my invention, the sensation of relief in television systems can be obtained by the transmission, in suitable conditions, of stereoscopic pairs of pictures and by the differentiation of these pictures by the above mentioned methods of optical polarizing.

This particular application of said methods of polarization involves serious advantages. In particular it will be possible on the one hand to make use of existing television plants in all their essential parts and, on the other hand, in many cases, to reduce, or even to eliminate the rotary parts which are often included in systems for the obtainment of relief. Finally, it will no longer be necessary, as in the "anaglyphe" method, to make use of colored glasses, which involve many obligations, in particular a loss of luminosity.

In order to carry out the method according to the invention, one may proceed, at the transmitting end in various ways, in particular:

Either (as supposed in Figs. 3 to 7) by juxtaposing on the sensitive element of the camera tube the two images of every stereoscopic pair, Or (as supposed in Figs. 8 to 13, some features of which may, besides, be used in the plants of Figs. 3 to 7) by successively forming at the same place of said sensitive element the two images of every pair.

Transmission, then reception and separation through optical polarizing will take place through any suitable means and, in particular, as hereinafter described.

First, according to the first of the two above specified processes at the transmitting end, it is of interest to proceed in such manner that scanning of the two pictures of every pair on the sensitive element of the camera tube takes place through the same scanning device, as ordinarily included in these tubes, possibly with the number of lines usually adopted, and even with a different number.

It should be understood that the camera tube may be of any suitable type, the term "sensitive element" having a very general meaning and being intended to apply for instance to a photosensitive mosaic directly scanned by an electronic beam or to a semi-transparent photocathode which forms the first electronic image of a secondary emission multiplier.

As shown by Figs. 3 and 4 which relate to the television transmitter, the two real images 21 and 22, which constitute the stereoscopic pair and come from two objectives 23 and 24 the axes of which are at a distance $d$ from each other, corresponding for instance to the interval between the eyes of a human being, are received on the signal plate 25 of a camera tube A and are disposed in a contiguous manner. This juxtaposition is obtained through optical means such as rhombic prisms 26 and 27, or combinations of total reflection prisms, mirrors, etc.

The scanning system of tube A permits of exploring the whole of these two images with a number L of lines and $n$ times per second, which number L of lines may include two interlaced line systems $a$ and $b$ (Fig. 4), for instance. Admitting that the electronic scanning beam starts at the top left hand corner (Fig. 4), the first odd line will scan the upper portion of the left hand image 21 and of the right hand image 22, the beam returning to scan the left hand image after the first line synchronizing pulse, and so on, both for the first system $a$ and for the second system $b$.

The phenomenon will occur $n$ times per second.

In the embodiment shown by Fig. 3, the transmitter includes, in addition to the usual line scanning generator which supplies the line synchronizing pulses 62, a line scanning pulse frequency doubler which inserts pulses 63 halfway between pulses 62.

Figure 6:
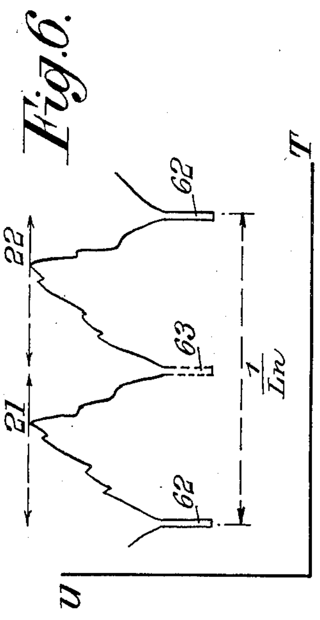
Fig. 6 shows the waveform of the modulated signal transmitted, with its synchronizing pulses, to the receiver of Fig. 5.
Figure 5A:
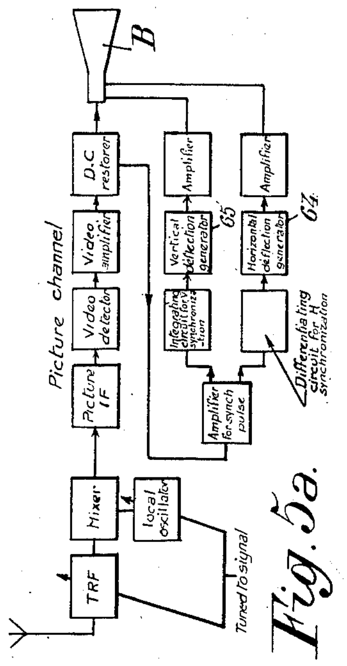
Figure 5:
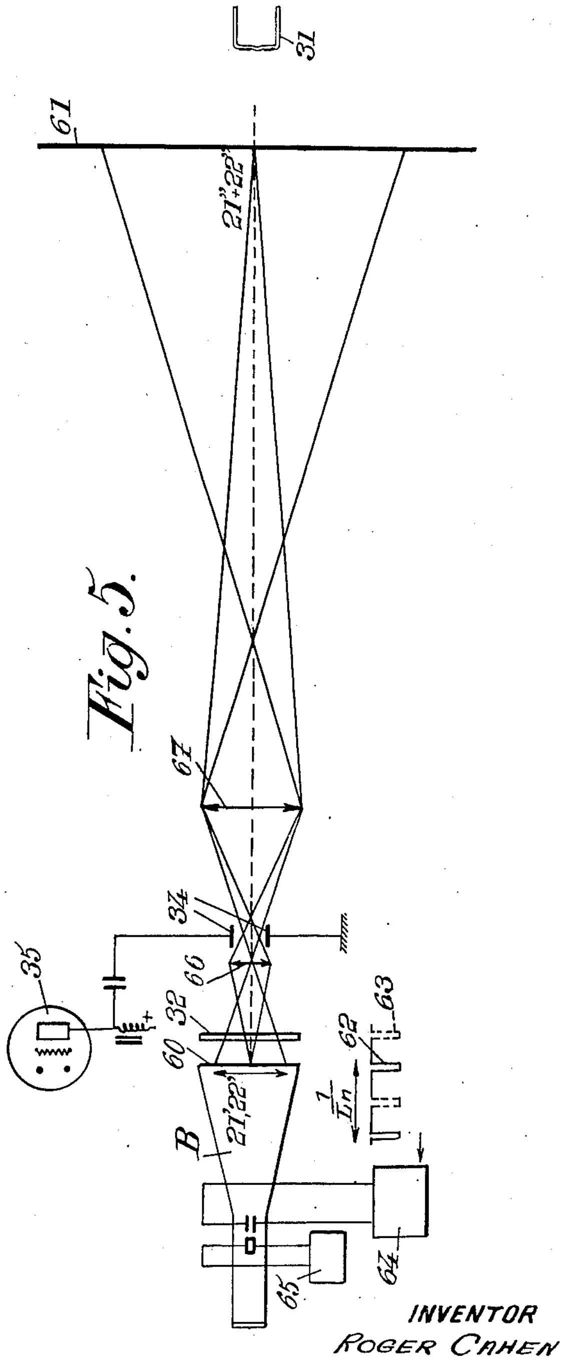
Figure 7:
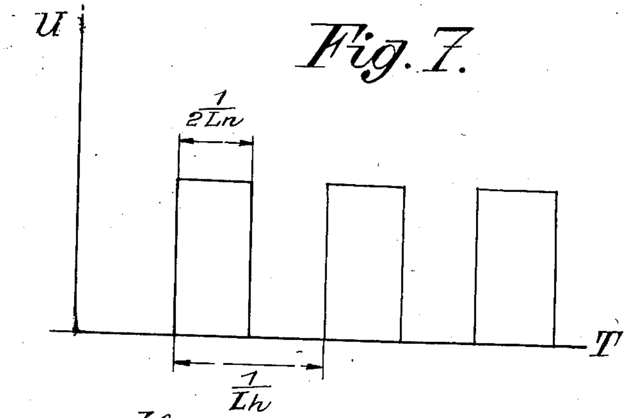
Fig. 7 is a diagram illustrating the form of the rectangular signals to be applied to a device of the receiver of Fig. 5.

Having thus a complex signal corresponding to pairs of pictures as above stated, the problem is to receive these pictures on television receiver tubes, for which purpose, for instance, I proceed as follows:

I superpose them on the receiver tube itself, through suitable electric or electronic means, which permits of transmitting them subsequently through a common optical channel in which the differentiating means are provided (Figs. 5 to 7).

The pictures can be viewed either through projection on a screen located on the outside of the tube (which may work either by reflection or by a transparency in the manner of a translucent screen), or directly on the screen of the tube itself.

According to the embodiment of Figs. 5 to 7, superimposition of the two images takes place electrically in the receiver tube. I proceed for instance in the following manner.

View recording, at the transmitting end, takes place as above (Figs. 3 and 4), which means that the two images 21 and 22 are scanned successively, line after line. At the receiving end, the same number $n$ of pictures per second is formed but scanning takes place at a rate corresponding to twice the number of lines, i. e. 2L, whereby the second half of every line of the composite picture at the transmitter is superposed approximately to the first one. In these conditions, the two pictures received will no longer be juxtaposed, but superposed to each other.

This scanning at frequency 2L at the receiver is obtained owing to the transmission of the two sets of pulses 62 and 63 from the transmitter.

This way of obtaining at the receiver a scanning at a rate equal to twice the rate of scanning at the transmitter through the use of supplementary signals 63 received from the transmitter seems advantageous for practical purposes but of course I may, according to my invention, use any suitable means for obtaining this result.

Fig. 6 shows the oscillogram of the video-frequency modulation relating to two successive pictures 21, 22, with said signals 62, 63. Time T is marked in abscissae and modulation voltages U in ordinates.

Signals 62, 63, after separation of the picture modulation, are applied to the device 64 which controls line scanning (Figs. 5a and 5). I have shown at 65 the frame scanning control device.

Superimposition being thus electrically obtained at 21' 22' on the screen of the tube, projection of the pictures can be performed by the same optical system on an external screen 61. This system includes for instance a microscope objective 66 in which the travel of the rays is inverted and a lens 67 which projects the real image that is obtained.

For differentiating the two images of the stereoscopic pair, I may proceed in various ways, an advantageous arrangement consisting in providing on the path of the light beam the following elements:

On the one hand a polarizing filter 33, and.

On the other hand, a system for varying, at a rate which is a function of the frequency of succession of the lines, the direction of the plane of polarization, under the effect of a suitably variable electric or magnetic action.

I may for instance use for this purpose an element the double refraction of which is variable as a function of the electric voltage applied thereto, for instance a Kerr cell 34 (Fig. 5).

Cell 34 is inserted in the anodic circuit of the last tube of an amplifier 35 which supplies it with a variable electric voltage in the form of rectangular signals synchronized from the transmitted line pulses.

The waveform of these rectangular signals is shown by Fig. 7, the horizontal parts corresponding to the voltage which rotates the plane of polarization of the light beam through 90°, during the reconstitution of the lines which form the second picture of the stereoscopic pair.

The sensation of relief can be obtained by looking at screen 61 through spectacles 31 including polarizing glasses the polarization planes of which are perpendicular to each other, and further parallel to the above mentioned polarization planes. The means that are used are purely static. However I might also make use of rotary polarizing discs such as will be hereinafter described.

If it is desired now, according to the second of the two methods of transmission mentioned at the beginning of this description, to obtain already at the transmitting station superimposition of the two pictures of every steroscopic pair on the sensitive element of the camera tube, I proceed for instance as illustrated by Figs. 8 to 13.

The superimposition is to take place through any optical systems, mirrors, combinations of total reflection prisms, etc.

I have shown on Fig. 8 such an optical system, formed for instance by two rhombic prisms *abcd* and *cefg*, between which there is disposed a total reflection prism *chd* the face *cd* of which is semi-transparent. A cube *almk* completes the system with a view to equalizing the length of the light paths. The two images formed by objectives 36 and 37 are superimposed, after two reflections, on the signal plate 25 of the camera tube.

In order to ensure successive transmission of the two pictures of the stereoscopic pair, I make use of a shutter disc 39 driven about its axis by a motor 40. This disc is shown in plan view, on Fig. 9, and includes a semi-circular slot 41, which clears only one objective at a time.

If the rate of revolution of disc 39 is $$\frac{n}{2}$$

revolutions per second, $n$ being the number of pictures per second recorded by the camera, the system will analyze, during every second, $$\frac{n}{2}$$

"left-hand" pictures and $$\frac{n}{2}$$

"right-hand" pictures, analysis of a left-hand picture taking place after that of a right-hand picture. In this case, the number of pictures per unit of time will be reduced to one half.

If the speed of revolution of disc 39 is equal to $n$, which is the number of pictures per second recorded by the camera, the system will analyze $n$ frames of the left-hand picture and $n$ frames of the right-hand picture, in the interlaced process of order 2 including therefore two frames. In this last mentioned case, the definition in the vertical direction will be reduced to one half, the number of pictures remaining $n$ for every perspective.

The pictures transmitted from a device of the kind of that of Fig. 8 can be received and separated as above indicated or by means of rotary filters such as will now be described.

On the receiver tube (Fig. 10), the images analyzed in L lines, $n$ times per second, are superimposed on the fluorescent screen of tube B, as above explained. They are projected through an objective 43 on screen 61, through a polarizing disc 45 driven by a synchronized motor 46.

In a first embodiment, this polarizing disc is in the form shown at 47 on Fig. 11, where a circular window includes polarizing filter elements marked in solid lines and the axes of the polarization planes of which are marked in dotted lines. These filters ensure, over 180°, a given polarizing of the rays that pass therethrough, and over the other 180°, a polarizing at right angles to the first one. Opaque fixation means 68 may be provided at two points which correspond to the frame scanning signals, at the ends of frames, with a width which must practically be to an angle ranging from 10° to 20°. These filters might also be caught between two translucent plates 48 according to the sectional view of Fig. 12.

In order to avoid the necessity of establishing a polarizing mosaic, I may use (Fig. 13) filters 47a and 50a in the form of a semi-circumference, instead of the above mentioned mosaic of polarizing filters. The polarization plane of filter 47a is given the shape shown at 47b, and the multiple polarization planes of filter 50a are given radial directions 50b, this through suitably directed rubbing operations applied to the crystals which constitute these polarizing filters.

In another embodiment, a double refraction rotary disc is used simultaneously with a fixed polarizing filter 49 placed across the path of travel of the light rays from the projecting cathode ray tube which ensures a determined plane of polarizing (Fig. 14).

Disc 47, analogous to that shown on Figs. 11 or 13, includes no filter on 180°, the other half-circle 50 being constituted by a mosaic of transparent sheets of a double refraction substance such as quartz, mica, cellulose acetate, etc.

These filters are of a thickness such that they rotate through 90° the initial polarization plane imposed by the fixed filter 49.

In the preceding cases, where I use a mixed polarizing disc or a double refracting disc over 180°, the driving motor rotates at a speed which ensures a perpendicular polarizing for every picture of the stereoscopic pair, that is to say at the same angular velocity as the recording motor.

As electrical energy distribution networks are generally synchronized, it is possible to obtain identical rates at the transmission end and at the receiving end by making use for instance of synchronized asynchronous motors. I may also control the motor at the receiving end by means of the transmitting frame synchronizing signals.

Suitable phase relation is ensured, in both cases, by varying the position of the stator with respect to the rotor.

I might of course, in a system for the reception of successive images (Figs. 8 to 10) provide as in the case of the device shown by Fig. 5, a part the double refraction of which is variable as a function of the electric voltage applied thereto, such for instance as a Kerr cell, instead of the polarizing or double refracting discs above described.

I may also take advantage of the electrically variable double refraction of substances such as piezoelectric quartz, Rochelle salt, tourmaline, etc., or the magnetically variable rotatory dispersion of substances having a high Verdet constant, such as flint, carbon sulfide, etc., or their synthetic derivatives, in both categories.

The methods and constructions above described with reference to Figs. 3 to 14 permit in all cases of ensuring at the receiver stereoscopic vision on a projecting, reflecting or diffusing screen, from a receiving cathode ray tube and with the use of spectacles having polarizing glasses.

But all that has been stated is also true when the fluorescent images of a cathode ray tube of larger screen diameter than the usual types used for projection are directly observed. In this case, it is necessary, in view of the absence of projection objective, of inverting or transposing the images and this is easily done by inverting the direction of line or frame scanning at the transmitting and receiving end.

Thus the superimposed pictures formed on the fluorescent screen 60 of tube B in the case of Fig. 10 might be observed by transmission through a polarizing film and a double refracting disc, as in the case of Fig. 14 or through a polarizing disc, as in the case of Fig. 11. Likewise, they might be observed through a fixed polarizing filter and a variable double refracting filter as in the case of Fig. 6.

On the other hand, it is to be noted that, according to my invention, the left and right images obtained in television might be recorded on a film so as to supply positive or negative pictures which, projected in the same conditions, with the use of devices similar to those above described, permit of giving the sensation of relief. These films may be projected on a screen or serve to cinematographic transmissions of differed television, according to the so-called "Telecinema" practice. In both cases, their recording is facilitated since there is the benefit of the higher sensitiveness of camera tubes with respect to photographic emulsions.

The luminous images supplied by the pictures of the film take the place of the images formed, in the preceding descriptions, on the sensitive plate of the camera tube or on the fluorescent screen of the receiving cathode ray tube.

On the moving picture film, each stereoscopic pair thus obtained can be recorded according to one of the methods above described, for forming on the television receiving screen each of the two images which constitute said pair.

When two contiguous pictures, one on the right hand side and the other on the left hand side are received on the television screen, it is advantageous to record these two images on the same picture of the projection screen.

When a right hand side image and a left hand side image are received successively on the television screen, it is advantageous to record on the film successively a picture of the right hand image and a picture of the left hand image, and so on.

The devices above described permit of reproducing the sensation of relief when the stereoscopic pair of pictures is projected, but they permit also of obtaining images under a single perspective by suppressing the image corresponding to the other perspective, which constitutes a return to ordinary television.

Concerning the spectacles 31 (Fig. 15) intended to permit of observing the images at the receiving end, they may be of any suitable type, provided that the polarization planes of their glasses have suitable respective directions, in particular at right angles to each other.

However, the following features should be mentioned.

Said planes supposed to be respectively at right angles to each other, may occupy an infinite number of positions. However, it is remarkable that, due to a physiological phenomenon, the fatigue of the eyes is minimum when these planes are symmetrical with respect to the vertical axis of symmetry of the human body. The positions *a* and *b* of Fig. 16 are therefore preferable to the position *c* of this figure.

On the other hand, it may be of interest to arrange these spectacles in such manner that they may serve to other uses, for instance to the elimination of light reflection in various circumstances (polarization on a sheet of water, on reflecting walls, etc.). But, for this purpose, it must be possible to bring the polarization planes of glasses 70 (Fig. 15) in suitable directions. These glasses must therefore be capable of turning about their respective optical axes in their frame 71, so that they can take any useful position, which may be indicated by suitable marks.

On the spectacles of Fig. 15, marks *h* correspond to the suppression of horizontal light reflections, *v* to that of vertical light reflections and *r* to the position for viewing in relief stereoscopic pairs as above described.

The polarizing filters that are used are made of substances which suitably cooperate with the pictures of the stereoscopic pair and preferably belong to the category of crystalline deposits of which herapathite was the first to be produced.

Concerning the projection screens 61, it has been stated that they could be either of the reflecting or of the diffusing kind, being therefore intended to be observed by reflection or by transmission. Any suitable material may be used. However in the first case they should be constituted by or coated with a matter which correctly reflects the light rays polarized in a given plane. Screens of the "metallized" or "vitrified" kind are well suitable for this purpose.

My invention has many advantages, in particular: a greater simplicity, a better luminous efficiency, and the possibility of using, without costly modifications, the existing installations.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A relief television system which comprises, in combination, a transmitter including a single light sensitive element, optical means for forming on said light sensitive element a composite image constituted by the juxtaposition of the stereoscopic components of a reproduction of the scene to be televised, a single device for scanning said element along lines running across both of said components, means responsive to variations of illumination of the scanned areas of said element for producing video signals and means for transmitting said signals, a receiver including a screen and means operative by the transmitted signals for reconstructing on said screen successively the lines of said composite image each in the form of two immediately successive and substantially superposed lines corresponding each to one half of the corresponding line of the composite image at the transmitter, shifting light polarization means interposed between said screen and the spectator's eyes and operatively connected with said receiver means for giving the polarization plane alternating rotations of ninety degrees in synchronism with the scanning of successive lines on said screen, and two polarizing viewing means interposed between said shifting polarization means and each of the spectator's eyes respectively, the polarization planes of said respective viewing means being parallel to those of said shifting polarization means respectively.

2. A relief television system which comprises, in combination, a transmitter including a single light sensitive element, optical means for forming on said light sensitive element a composite image constituted by the juxtaposition of the stereoscopic components of a reproduction of the scene to be televised, a single device for scanning said element along lines running across both of said components, means responsive to variations of illumination of the scanned areas of said element for producing video signals and means for transmitting said signals, a receiver including a screen and means operative by the transmitted signals for reconstructing on said screen successively and in inverted scanning order the lines of said composite image each in the form of two immediately successive and substantially superposed lines corresponding each to one half of the corresponding line of the composite image at the transmitter, shifting light polarization means interposed between said screen and the spectator's eyes and operatively connected with said receiver means for giving the polarization plane alternating rotations of ninety degrees in synchronism with the scanning of successive lines on said screen, and two polarizing viewing means interposed between said shifting polarization means and each of the spectator's eyes respectively, the polarization planes of said respective viewing means being parallel to those of said shifting polarization means respectively.

3. A relief television system which comprises, in combination, a transmitter including a single light sensitive element, optical means for forming on said light sensitive element a component image constituted by the juxtaposition of the stereoscopic components of a reproduction of the scene to be televised, a single device for scanning said element along lines running across both of said components, means responsive to variations of illumination of the scanned areas of said element for producing video signals and means for transmitting said signals, a receiver including a screen and means operative by the transmitted signals for reconstructing on said screen successively the lines of said composite image each in the form of two immediately successive and substantially superposed lines corresponding each to one half of the corresponding line of the composite image at the transmitter, shifting light polarization means interposed between said screen and the spectator's eyes and operatively connected with said receiver means for giving the polarization plane alternating rotations of ninety degrees in synchronism with the scanning of successive lines on said screen, another screen, means adapted to cooperate with said polarization means for projecting the images formed on the first mentioned screen onto said second mentioned screen, and two polarizing viewing means interposed between said second mentioned screen and each of the spectator's eyes respectively, the polarization planes of said respective viewing means being parallel to those of said shifting polarization means respectively.

4. A system according to claim 1 in which said receiver includes screen scanning means arranged to perform line scanning at a rate equal to twice the line scanning rate of the transmitter scanning means.

5. A system according to claim 1 further including means at said transmitter for transmitting line synchronizing pulses and means for transmitting additional pulses at equal time intervals between said transmitter synchronizing pulses, and screen scanning means at said receiver for performing line scanning in response to both of these series of pulses.

ROGER CAHEN.

References Cited in the file of this patent

UNITED STATES PATENTS

| Number | Name | Date |
|---|---|---|
| 1,978,684 | McCreary | Oct. 30, 1934 |
| 1,988,931 | Alexanderson | Jan. 22, 1935 |
| 2,061,016 | Walton | Nov. 17, 1936 |
| 2,107,464 | Sworykin | Feb. 8, 1938 |
| 2,209,747 | Eisler | July 30, 1940 |
| 2,301,254 | Carnahan | Nov. 10, 1942 |
| 2,335,180 | Goldsmith | Nov. 23, 1943 |
| 2,417,446 | Reynolds | Mar. 18, 1947 |

FOREIGN PATENTS

| Number | Country | Date |
|---|---|---|
| 231,805 | Switzerland | July 17, 1944 |
| 325,362 | Great Britain | Nov. 13, 1929 |
| 519,488 | Great Britain | Mar. 28, 1940 |
| 552,582 | Great Britain | Apr. 5, 1943 |
| 562,334 | Great Britain | Oct. 6, 1943 |